Figure 1:
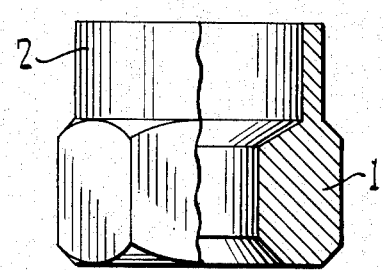

Nov. 28, 1944. R. W. LUCE 2,363,680
THREADED LOCKING DEVICE
Filed July 17, 1941

INVENTOR.
Richard W. Luce
BY George T. Gill
ATTORNEY

Patented Nov. 28, 1944

2,363,680

UNITED STATES PATENT OFFICE 2,363,680

THREADED LOCKING DEVICE

Richard W. Luce, Southport, Conn.

Application July 17, 1941, Serial No. 402,726

2 Claims. (Cl. 151—21)

The invention herein disclosed relates to a threaded locking device of the type in which the locking effect is attained by setting up and maintaining a frictional contact between the surfaces of the engaging threads of two threaded elements.

In United States Letters Patent No. 2,196,637, issued April 9, 1940, there is disclosed and described a threaded locking device of this kind. The particular device illustrated in that patent is a lock-nut that includes a body portion having the load-carrying thread therein, another threaded portion spaced from and axially aligned with the body portion and an intermediate resilient portion uniting the two threaded portions. The resilient portion is in the form of a section of a bellows and it is arranged to partake of a bending action upon relative axial movement of the two threaded portions. The threaded portions are normally maintained with the threads thereof out of phase. The necessary relative axial movement of the threaded portions required to bring the threads thereof into engaging relation with the thread of a bolt entered therein expands the resilient portion which exerts a force that maintains the threads of the nut and the bolt in frictional contact. The resilient portion of such lock-nuts is formed by an internal recessing and external form-cutting operation. This internal recessing operation on nuts of the smaller size requires rather delicate tools and in consequence, a slower production rate in the production of the smaller sized nuts, particularly when the nuts are made of tough alloy steel.

An object of the present invention is to provide a threaded locking device of this kind that requires no internal recessing operation. Another object of the invention is to provide such a threaded locking device that is readily produced, even in the smaller sizes, in large quantities at comparatively high rates of production. A further object of the invention is to provide a threaded locking device of this kind that, even in the smaller sizes, may be produced on automatic machinery and comparatively inexpensively.

The foregoing objects and certain advantages that will hereinafter appear are realized in accordance with the invention in the threaded locking devices, constituting certain specific examples of embodiments of the invention, that are illustrated in the drawing and described in detail below.

Figure 2:
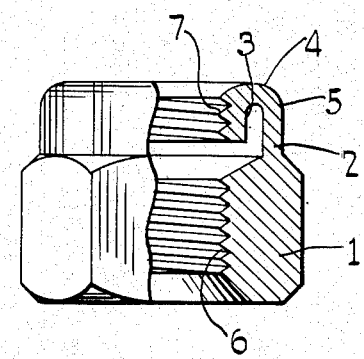
Figure 3:
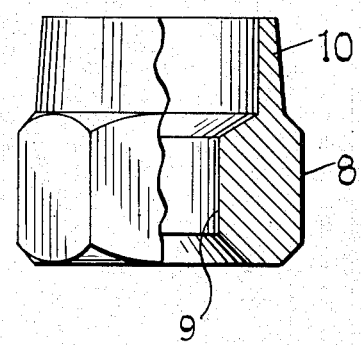
Figure 4:
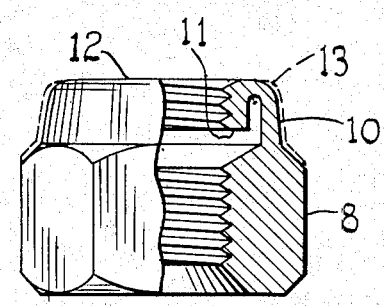
Figure 5:
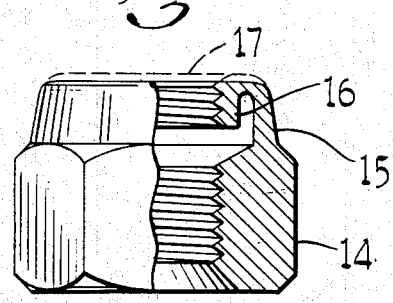

The drawing includes:

Fig. 1 which is an elevation, partly in section, of a nut blank;

Fig. 2 which is an elevation, partly in section, of a nut made from the blank of Fig. 1;

Fig. 3 which is an elevation, partly in section, of another nut blank;

Fig. 4 which is an elevation, partly in section, of a nut made from the blank of Fig. 3; and Fig. 5 which is an elevation, partly in section, of a modified form of nut made from a blank like that of Fig. 3.

The blank and lock nut illustrated in Figs. 1 and 2 is made from hexagonal bar stock. From such stock, a nut blank, as shown in Fig. 1 is machined. This blank includes a nut body 1 with a cylinder 2 extending from one end. The internal diameter of the cylinder is substantially greater than the bore diameter of the body and the cylinder is axially aligned with the body portion. This cylinder in part, forms the resilient portion of the finished nut, as hereinafter described, and is of such wall thickness as to provide the desired resiliency in accordance with the particular metal used. In the blank illustrated the wall thickness of the cylindrical extension is slightly less than that required to take and maintain a thread.

The end portion of the cylinder 2 is inturned, that is the cylinder is reversely bent, inwardly between its ends, to form an inturned extension 3 of the same internal diameter as the bore of the body. In forming the inturned extension, the metal of the inturned extension is crowded, that is to say, the same volume of metal is crowded into a circle of lesser diameter. The result is that the inturned extension has a wall section substantially thicker than either the curved connecting portion 4 or the adjacent portion 5 of the cylinder. This inturned extension 3 thus has a wall thickness that is sufficient to take and maintain a thread.

The blank so formed is tapped, the tap being run through the body of the nut and the inturned extension 3 so that threads 6 and 7 of the same pitch are formed in the body and the inturned extension respectively. After the nut is thus tapped, the nut is compressed axially to take a set such that the thread of the inturned extension is positioned slightly out of phase with the thread of the body portion, just slightly more than sufficient to take up the ordinary commercial thread tolerances.

With this arrangement, when a bolt or screw is entered in the nut, it is entered in the body and passes therethrough. Before the bolt enters the thread of the inturned extension it must move the extension axially an amount to bring the thread thereof into coincidence with its own thread. This movement is permitted by the resiliency of the curved section 4 and adjacent portion 5 of the cylinder which partake of a bending action. The resiliency of these portions, causes the threads of the nut and bolt to be drawn into frictional engagement. The resulting frictional force between the engaging surfaces of the threads is sufficient to maintain the nut against relative rotational movement on the bolt from the effects of shock and vibration normally encountered in service and tending to loosen the nut on the bolt.

The nut blank and nut illustrated in Fig. 4 is substantially the same as that illustrated in Fig. 1, but differs therefrom in the cylindrical extension. The nut blank (Fig. 4) includes a nut body 8, bored longitudinally as at 9, and a cylinder 10 extending from one end of the body. The wall of this cylinder 10 is tapered externally and the wall section is thicker adjacent the nut body than at the end. The wall thickness of this cylinder is sufficient to take and maintain a thread.

The portion 10 is rolled over inwardly to form an inturned extension 11, of the same internal diameter as the bore 9 of the nut body, axially aligned with the nut body. When this operation is performed, the wall thickness of the inturned extension is sufficient to take and maintain a thread. The wall thickness of the cylinder and the curved connecting portion 12 are reduced in thickness to provide the desired resiliency. This reduction may be effected with a form cutting tool which removes the metal from the external side as between the broken line 13 and the solid line (Fig. 4). In this way the thickness for the desired resiliency is attained. By making the nut in this way the relative wall thickness of the inturned extension 11, the cylinder 10 and the connecting section 12 may be more accurately controlled.

Next the nut is tapped. The tap is run through the body and the inturned extension so that each has the same thread. After the nut is tapped, it is compressed axially to take a set with the thread of the inturned extension out of phase with the thread of the nut body. The out of phase relation is slightly more than required to take up the commercial thread tolerances.

In Fig. 5, there is disclosed a nut that is likewise made from a blank such as that illustrated in Fig. 3. The nut includes a body portion 14 and an extension 15, reversely bent inwardly, to form an inturned extension 16. The end of the blank, from which this nut is made, that is, the external surface of the reverse bend is ground, reducing the thickness of the wall at this section by the removal of metal between the broken line 17 and the adjacent solid line. This constitutes an efficient way of securing the thickness suitable for the desired resiliency. The nut blank is then tapped and compressed to put the thread of the inturned extension 16 out of phase with the thread of the body. The nut of Fig. 5 may also be made in the same way from a blank such as that of Fig. 1. In such a case the wall of the extension on the blank would be substantially thicker.

From the foregoing descriptions of the embodiments of the invention illustrated in the drawing, it will be seen that by this invention there is provided a lock-nut with a smooth, unbroken surface. Also the overall height or length of the nut is not much greater than an ordinary nut.

It will be obvious that various changes may be made by those skilled in the art in the details of the embodiments of the invention illustrated in the drawing and described in detail above within the principle and scope of the invention as expressed in the appended claims.

I claim:

1. A lock-nut for effecting a frictional engagement between the threads thereof and the thread of a bolt entered therein comprising an internally tapped body having the load carrying threads therein, an unbroken cylindrical portion at one end of the body portion of larger internal diameter than the body portion and including a tapped extension inturned through substantially one hundred and eighty degrees of greater wall thickness than the cylindrical portion and positioned with the thread thereof out of phase with and toward the thread of the body portion.

2. A lock-nut according to claim 1 characterized by the fact that the wall section at the reverse bend is reduced in thickness.

RICHARD W. LUCE.